United States Patent
Owoeye et al.

(10) Patent No.: US 12,287,048 B2
(45) Date of Patent: Apr. 29, 2025

(54) PIPE CONNECTION SYSTEMS IN OIL AND GAS APPLICATIONS

(71) Applicant: Saudi Arabian Oil Company, Dhahran (SA)

(72) Inventors: Oladele Owoeye, Dhahran (SA); Zakaria Al Bu, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 36 days.

(21) Appl. No.: 17/978,508

(22) Filed: Nov. 1, 2022

(65) Prior Publication Data
US 2024/0142026 A1    May 2, 2024

(51) Int. Cl.
*F16L 15/00* (2006.01)
*E21B 17/042* (2006.01)
*F16L 15/06* (2006.01)

(52) U.S. Cl.
CPC .......... *F16L 15/001* (2013.01); *E21B 17/042* (2013.01); *F16L 15/003* (2013.01); *F16L 15/06* (2013.01)

(58) Field of Classification Search
CPC ........ F16L 15/001; F16L 15/06; E21B 17/042
See application file for complete search history.

(56) References Cited

U.S. PATENT DOCUMENTS

| | | | |
|---|---|---|---|
| 2,772,102 A | | 11/1956 | Webb |
| 4,582,348 A | * | 4/1986 | Dearden ............... E21B 17/042 |
| 4,623,173 A | * | 11/1986 | Handa ................... E21B 17/042 |
| 4,662,659 A | | 5/1987 | Blose et al. |
| 8,925,975 B2 | * | 1/2015 | Granger ................ E21B 17/042 |
| 2004/0017081 A1 | | 1/2004 | Simpson et al. |
| 2004/0104575 A1 | * | 6/2004 | Ellington .............. E21B 17/042 |
| 2004/0130152 A1 | * | 7/2004 | DeLange .............. E21B 17/042 |
| 2004/0251686 A1 | | 12/2004 | Otten et al. |
| 2016/0312931 A1 | * | 10/2016 | Martin .................. E21B 17/042 |
| 2017/0254156 A1 | * | 9/2017 | Aguilar Mendez ... E21B 17/042 |
| 2018/0313168 A1 | * | 11/2018 | Sugino .................. E21B 17/042 |
| 2019/0330930 A1 | | 10/2019 | Oku et al. |
| 2021/0317856 A1 | | 10/2021 | Harvey et al. |
| 2021/0404265 A1 | * | 12/2021 | Galle, Jr. .............. E21B 17/042 |

FOREIGN PATENT DOCUMENTS

| | | |
|---|---|---|
| CN | 111448408 | 7/2020 |
| WO | WO 2008116891 | 10/2008 |
| WO | WO 2015099757 | 7/2015 |

* cited by examiner

*Primary Examiner* — Zachary T Dragicevich
(74) *Attorney, Agent, or Firm* — Fish & Richardson P.C.

(57) ABSTRACT

A pipe connection system for use in a well completion system includes an inner connector and an outer connector. The inner connector includes a tapered wall and multiple pin threads arranged along the tapered wall, wherein a pitch between projections formed by the multiple pin threads changes along an axial length of the pin connector. The outer connector is formed complementary to the inner connector along at least a portion of the outer connector.

20 Claims, 4 Drawing Sheets

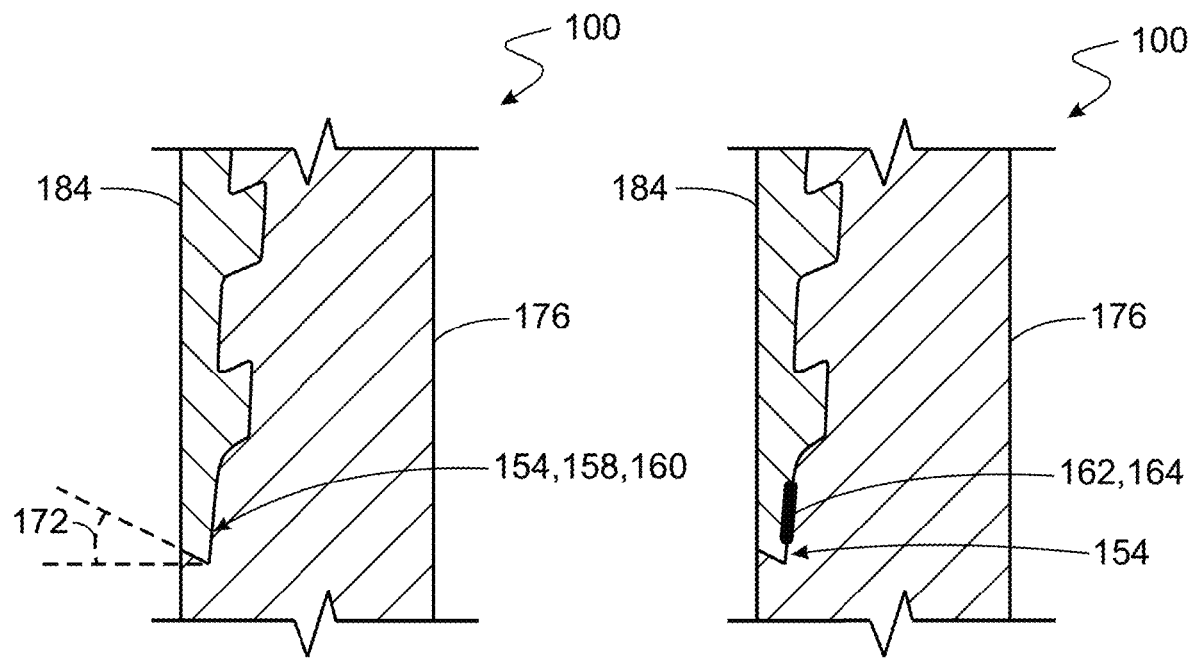
FIG. 4
FIG. 5
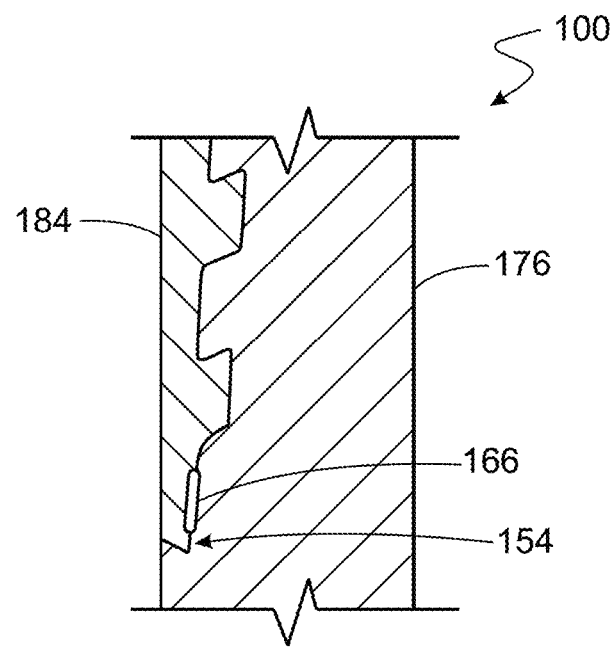
FIG. 6

PIPE CONNECTION SYSTEMS IN OIL AND GAS APPLICATIONS

TECHNICAL FIELD

This disclosure relates to pipe connection systems including pin and complementary box connectors with advantageous mating features that enhance a compression capacity at a pipe connection.

BACKGROUND

Tubular completions used in oil wells and wells with high gas-oil ratios often experience undesired tubing-casing-annulus (TCA) pressure. Connections used for such completions often have reduced compression capacity and are often landed in compression. During production operations, the connections may buckle helically under compressions loads and accordingly lose connection integrity. Such failures require costly well interventions.

SUMMARY

This disclosure relates to pipe connection systems including pin and complementary box connectors with advantageous mating features that enhance a compression capacity at a pipe connection.

In one aspect, a pipe connection system for use in a well completion system includes an inner connector and an outer connector. The inner connector includes a tapered wall and multiple pin threads arranged along the tapered wall, wherein a pitch between projections formed by the multiple pin threads changes along an axial length of the pin connector. The outer connector is formed complementary to the inner connector along at least a portion of the outer connector.

Embodiments may provide one or more of the following features.

In some embodiments, a last thread portion of the multiple pin threads has a load flank angle that is between about +1.0 degree and about +1.1 degrees.

In some embodiments, the load flank angle is about +1.0 degree.

In some embodiments, a last thread portion of the multiple pin threads is wider than the remaining portion of the multiple pin threads.

In some embodiments, a last thread portion of the multiple pin threads is wider than the remaining portion of the multiple pin threads combined with increased height close to matching previous thread.

In some embodiments, each pin thread of the multiple pin threads extends at an acute angle with respect to a thread axis of the inner connector.

In some embodiments, the multiple pin threads include two helical pin threads.

In some embodiments, the outer connector includes two helical box threads.

In some embodiments, one of the two helical pin threads leads the other of the two helical pin threads by about 180 degrees.

In some embodiments, the pitch is most coarse at a tapered end of the pipe connection system.

In some embodiments, one or more of the projections have a tapered profile.

In some embodiments, the projections have rounded edges.

In some embodiments, the multiple pin threads further form recesses.

In some embodiments, the recesses have a tapered profile.

In some embodiments, the pipe connection system further includes a resilient seal that surrounds a portion of the inner connector.

In some embodiments, the inner and outer connectors together form a metal-to-metal seal.

In another aspect, a method includes mating a first pipe section with a second pipe section at a pipe connection system. The pipe connection system includes an inner connector and an outer connector. The inner connector includes a tapered wall and multiple pin threads arranged along the tapered wall, wherein a pitch between projections formed by the multiple pin threads changes along an axial length of the pin connector. The outer connector is formed complementary to the inner connector along at least a portion of the outer connector.

The details of one or more embodiments are set forth in the accompanying drawings and description. Other features, aspects, and advantages of the embodiments will become apparent from the description, drawings, and claims.

DESCRIPTION OF DRAWINGS

FIG. 4 is a side view of a second, opposite end of the pipe connection system of FIG. 1.

FIG. 5 is a side view of the second end of the pipe connection system of FIG. 1 as equipped with a resilient seal.

FIG. 6 is a side view of the second end of the pipe connection system of FIG. 1 with a gap formed between the outer and inner connectors.

DETAILED DESCRIPTION

Figure 1:
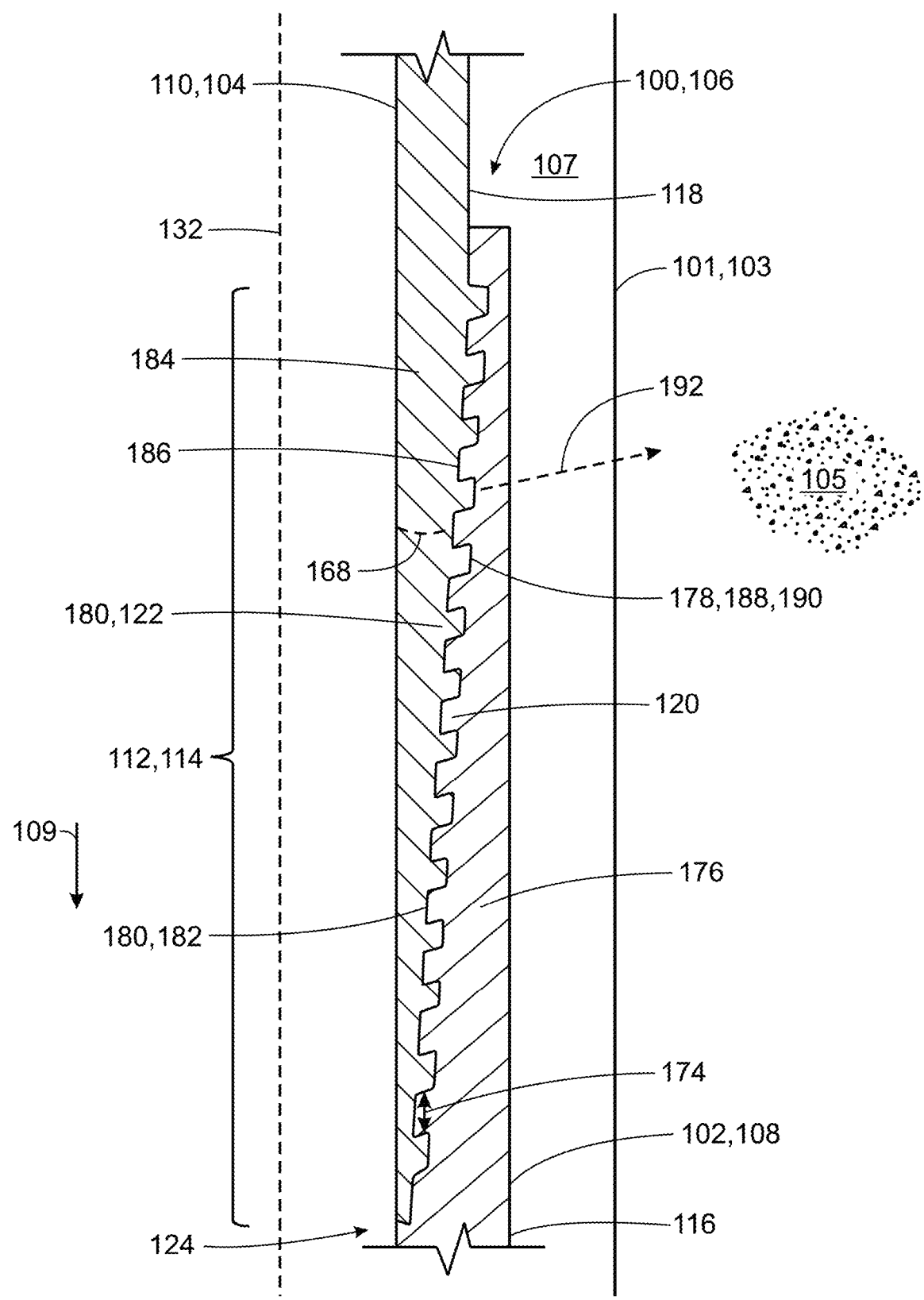
FIG. 1 is a side view of an example pipe connection system including an outer connector and an inner connector.

FIG. 1 illustrates an example pipe connection system 100 by which two pipe sections 102, 104 are connected within a casing 101 that has been installed to a wellbore 103 formed in a rock formation 105. The pipe sections 102, 104 are substantially tubular components such that each pipe section 102, 104 has a substantially circular cross-sectional profile. The pipe sections 102, 104 are part of a longer production tubing 106 within a well completion system. The production tubing 106 and the casing 101 together form an annular region 107 (e.g., an annulus). The outer pipe section 102 includes an outer connector 108 (e.g., a female box connector), and the inner pipe section 104 includes an inner connector 110 (e.g., a male pin connector).

The connectors 108, 110 form the pipe connection system 100, which provides an improved connection as compared to conventional connections between adjacent pipe sections of a production tubing. Accordingly, the pipe connection system 100 is designed to prevent fluid leakage between the pipe sections 102, 104 and thereby prevent the accumulation of tubing-casing-annular (TCA) pressure within the annular region 107. The connectors 108, 110 are formed substantially complementary to each other and can be single or double-thread pitch connectors (e.g., each connector containing two helical threads with different pitches, where one of the two threads is positioned 180 degrees ahead of the other thread along a shaft of the connector, with the coarser thread located at the nose section of the pin connection).

The pipe connection system 100 includes several features that provide an improved connection between the pipe sections 102, 104. For example, each of the connectors 108, 110 has a substantially tapered shape along a mating section 112, 114 (e.g., a nose) that extends from a base portion 116, 118. The tapered shape promotes mating (e.g., stab-in) between the connectors 108, 110 and reduces the risk of cross-threading among the connectors 108, 110. The tapered shape of the outer connector 108 (e.g., an inner tapered shape) results in a wall thickness that increases along an axial direction 109 and an inner diameter that decreases along the axial direction 109. The tapered shape (e.g., an outer tapered shape with a substantially frustoconical exterior profile) of the inner connector 110 results in a wall thickness and an outer diameter that both decrease along the axial direction 109. In some embodiments, the mating sections 112, 114 of the connectors 108, 110 have a taper of ratio of about 1:12 (about 1 inch: 12 inches) or about 1 taper per foot (TPF) (e.g., about 1 inch per foot).

According to the double-thread construction, the outer connector 108 includes a connector wall 176 (e.g., a shank) and two helical box threads 120 that are formed around and along the connector wall 176. The box threads 120 form helical recesses 178 (e.g., roots or other receptacles) and helical projections 180 that terminate at crests 182. Similarly, the inner connector 110 includes a connector wall 184 (e.g., a shank) and two helical pin threads 122 that are formed around and along the connector wall 184. The pin threads 122 form helical recesses 186 (e.g., roots or other receptacles) and helical projections 188 that terminate at crests 190. The pin threads 122 and the box threads 120 are engaged (e.g., mated) with each other to securely connect the outer and inner connectors 108, 110.

Figure 7:
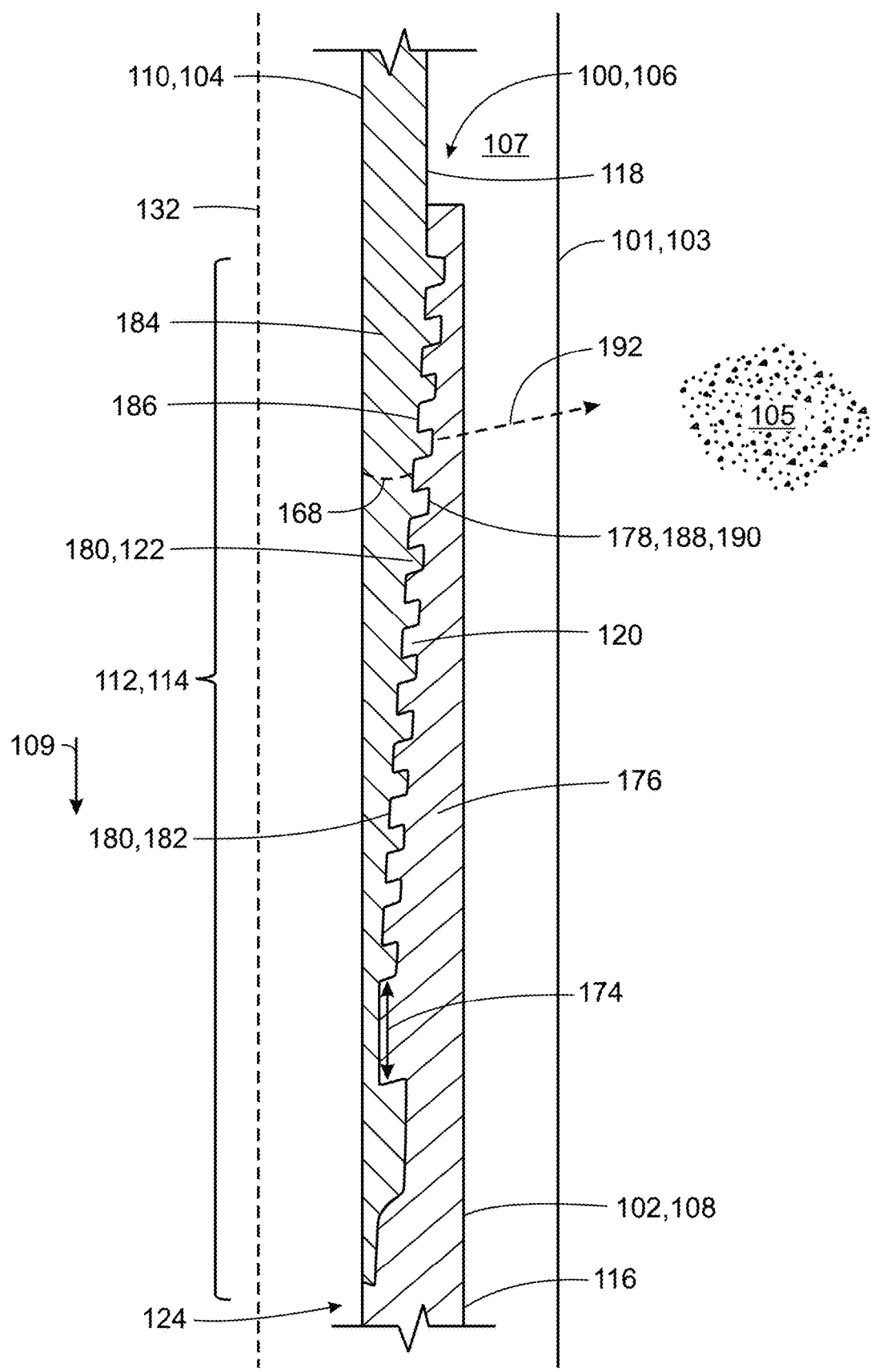
FIG. 7 is a side view of an example pipe connection system including an outer connector and an inner connector.

In some embodiments, a pitch (e.g., an axial distance 174 between adjacent projections 180 or adjacent projections 188) increases (e.g., becomes courser) along the axial direction 109. In some embodiments, the pitch remains substantially constant along a portion of the connectors 108, 110. A combination of the double-thread structure of the connectors 108, 110 and the relatively coarse pitch near a tapered end 124 of the pipe connection system 100 (e.g., refer to FIG. 7) reduces the risk of cross-threading and improves operational efficiency of the mating between the outer and inner connectors 108, 110. Furthermore, an integrity of the mating between the outer and inner connectors 108, 110 with such features is improved as compared to mating between the connectors 108, 110 at stress-bearing points of the mating.

Figure 2:
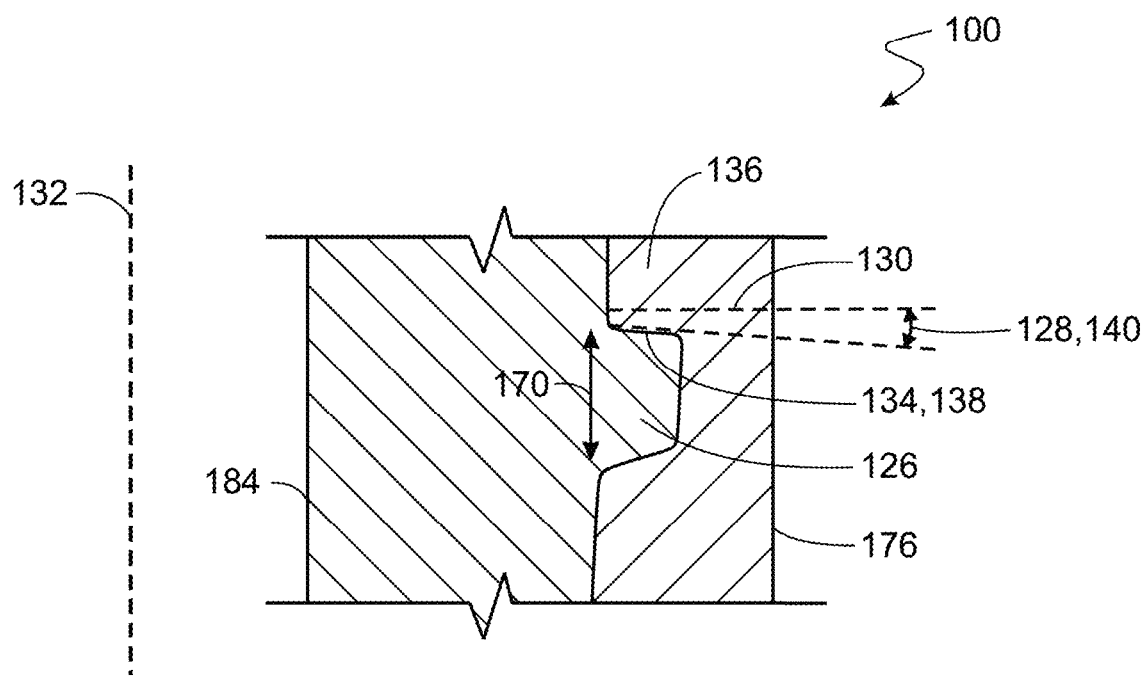
FIG. 2 is a side view of a last engaged thread region of the pipe connection system of FIG. 1.

Referring to FIGS. 1 and 2, the last engaged pin thread portion 126 of the pin threads 122 has a load flank angle 128 of about 1.0 degree to about 1.1 degrees (e.g., about +1.0 degree). In some embodiments, the load flank angle is an angle between the last edge 134 of the thread portion 126 and an axis 130 that is perpendicular to a thread axis 132. (In the example of FIG. 2, the thread axis 132 is coincident with central axes of the outer and inner connectors 108, 110.) A last engaged box thread portion 136 has a complementary profile such that a last edge 138 of the thread portion 136 has a corresponding angle 140 of the same value. As compared to a negative load flank angle, the load flank angle 128 (e.g., and the corresponding angle 140) reduces the risk of deformations and loss of structural integrity of the last engaged thread under high tensile load. Threads with a negative load flank angle in the last engaged thread tend to shear off the thread rather than slide over the threads when sufficiently high axial forces are applied, resulting in structural failure of the connection and non-reusability. Accordingly, this geometric feature (e.g., the angles 128, 140) of the outer and inner connectors 108, 110, combined with other features described below, supports an increase in tensile capacity of the pipe connection system 100. In addition, this geometric feature of the connection (e.g., the positive load flank angle) contributes to reducing the risk of thread galling and reduces the plasticity (e.g., plastic deformation) at the thread portions 126, 136, thereby improving the mechanical integrity of the pipe connection system 100.

The angles 128, 140 (e.g., as provided according to the above discussed range and example value) achieve an optimal configuration as related to relative sliding and radial separation between the thread portions 126, 136 such that an optimal amount of the run-out feature of the thread portions 126, 136 are utilized. Sub-optimal configurations with respect to these parameters increases the risk of structural failure under high tensile force. In some embodiments, geometric modification of the thread profile of the last engaged thread and use of the thread run-out features increase thread engagement of the connection and support reduction in plasticity of the last engaged thread portions 126, 136. These effects increase connection integrity and reusability of the pipe connection system 100 (e.g., allowing multiple matings and separations or break-outs) for a work string, a landing, or a well test string.

In some embodiments, increasing the width 170 and the height of the thread portion 126 of the last engaged thread reduces the risk of plastic deformation under increased tensile loads (e.g., during mating or post-mating, during pressure testing or a cementing operation) and ultimately reduces the risk of thread jump-out. For example, the width 170 of the thread portion 126 is increased relative to the width of other sections of the thread. This geometric feature improves the rigidity of the last engaged thread and, in combination with an increased thread height close to matching previous thread, ensures engagement of the thread and helps to alleviate plastic deformation that may otherwise be relatively severe at the thread portion 126. The height is optimized to reduce the risk of deformation in this section without complicating the run-out featuring during the threading process. Where this feature is not modified or optimized, the severity of the plastic deformation can otherwise initiate thread separation, which can ultimately result in thread jump-out.

Figure 3:
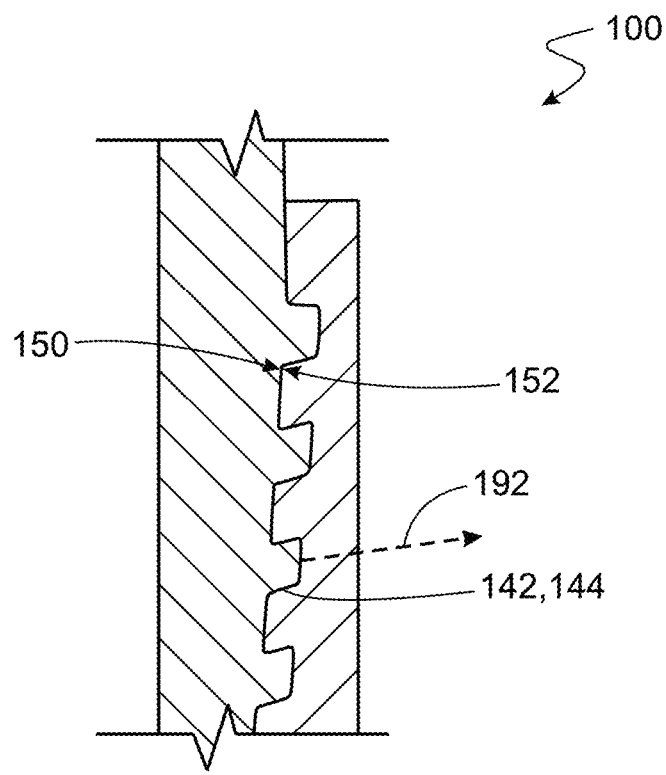
FIG. 3 is a side view of a first end of the pipe connection system of FIG. 1.

Referring to FIG. 3, the projections 180, 188 extend at an acute angle with respect to the thread axis 132 and have tapered profiles 142, 144 along a projection direction. Additionally, the recesses 178, 186 and the crests 182, 190 have rounded edges 150, 152, respectively. In some embodiments, the rounded edges 150, 152 are provided as rounded box chamfers. The rounded edges 150, 152 provide resistance to thread galling such that they are anti-galling characteristics that reduce a contact force between the projections 180, 188 and recesses 178, 186 during a mating process.

Referring to FIG. 4, the inner mating section 114 of the inner connector 110 defines a terminal lip 154 near the tapered end 124 of the pipe connection system 100. The lip 154 has a reverse angle 172 that positively contacts a complementary shoulder 158 (e.g., a load shoulder) of the outer mating section 112 of the outer connector 110. In some embodiments, the reverse angle 172 is about 15 degrees to about 15.5 degrees (e.g., about 15 degrees). The positive contact between the lip 154 and the shoulder 158, together with a metal-to-metal seal between the inner mating section 114 and the outer mating section 112 along a circumferential sealing surface 160, improves a compression efficiency of the pipe connection system 100.

Referring to FIG. 5, in some embodiments, the lip 154 is equipped with a resilient seal 162 that extends around a circumference of the sealing surface 160. The resilient seal 162 provides sealing redundancy and helps to prevent fluid egress from the pipe connection system 100 to the annular region 107, which is especially important when the pipe connection system 100 is utilized as part of a work string, a landing string, or a test string. In some embodiments, the resilient seal 162 is made of one or both of a polymeric material and an elastomeric material. The resilient seal 162 may be water-swellable (e.g., volumetrically swellable) or non-water-swellable. In some embodiments, either or both of the lip 154 and the shoulder 158 define a recessed profile 164 that is sized and shaped to accommodate the resilient seal 162. In some embodiments, the lip 154 and the shoulder 158 are structured (e.g., shaped and sized) to mate with an interference fit, with or without the resilient seal 162, and whether the resilient seal 162 is volumetrically swellable or non-swellable. In some embodiments, one or more resilient seals may be positioned at a different locations along the mating sections 112, 114 of the connectors 108, 110.

Referring to FIG. 6, in some embodiments, either or both of the lip 154 and the shoulder 158 include a recessed profile that defines a gap 166 along or around the lip 154 and the shoulder 158 to accommodate excessive pipe lubricant (e.g., dope) during the mating process. The gap 166 is sized such that it does not have a significant impact on the compression capacity of the pipe connection system 100 once the pipe sections 102, 104 are mated. In some embodiments, a similar gap may be formed between the pin threads 122 and the box threads 120 along a different axial location.

The pipe connection system 100 has several advantages as compared to conventional well completion connections. For example, the pipe connection system 100 has an improved connection capacity that allows the pipe connection system 100 to be used as a work-string and used with cemented completions in horizontal applications and multilaterals without increasing the risk of connection failure under compression loads or the risk of thread jump-out. This is accomplished by an increased number of thread engagements (e.g., according to the double-thread structure) without increasing the length of the outer and inner connectors 108, 110; inclusion of the extended lip 154 and the load shoulder 158 with the metal-to-metal seal to improve connection sealability under compression loads; the double-thread pitch that is courser near the tapered end 124 of the pipe connection system 100 to reduce the risk of cross-threading, the tapered shape along the connectors 108, 110 to improve stabbing with a reduced risk of cross-threading, the positive 1 degree load flank angle and increased width 170 of the last engaged thread portion to reduce the risk of jump-out, and the reduction of a galling risk of the connection during mating. In total, the pipe connection system 100 has an enhanced compression capacity and an improved sealability as compared to conventional pipe connection systems of completion strings. This enhanced capacity results in a reduction in workover frequency that would otherwise be necessitated by TCA pressure due to connection failures.

While the pipe connection system 100 has been described and illustrated with respect to certain dimensions, sizes, shapes, arrangements, materials, and methods, in some embodiments, a pipe connection system that is otherwise substantially similar in construction and function to the pipe connection system 100 may include one or more different dimensions, sizes, shapes, arrangements, configurations, and materials or may be utilized according to different methods. For example, in some embodiments, a pipe connection system that is otherwise substantially similar in construction and function to the pipe connection system 100 includes an inner mating section and outer mating section with a mating, contact, or engagement that are provides as a spherical-to-tapered profile combination, a tapered-to-spherical profile combination, or a spherical-to-spherical profile combination along a sealing surface. Such profile combinations will be configured such that they will not introduce additional stress to the connection or result in plastic deformation during mating. Accordingly, the such profile combinations will not jeopardize the connection during high compression or cyclic loading.

Other embodiments are also within the scope of the following claims.

What is claimed is:

1. A pipe connection system for use in a well completion system, the pipe connection system comprising:
    an inner connector comprising a tapered wall and a plurality of pin threads arranged along the tapered wall, wherein a pitch between projections formed by the plurality of pin threads changes along an axial length of the inner connector, and wherein the pitch is most coarse at a tapered end of the inner connector;
    a resilient seal that surrounds a terminal lip of the inner connector at the tapered end; and
    an outer connector formed complementary to the inner connector along at least a portion of the outer connector,
    wherein the inner and outer connectors comprise a central axis and a double-thread construction that extends along the central axis,
    wherein the terminal lip forms a reverse angle along which the terminal lip of the inner connector contacts a shoulder of the outer connector,
    wherein the shoulder is formed complementarily to the terminal lip, and
    wherein the reverse angle is an acute angle that is formed between an end surface of the terminal lip and a transverse axis oriented perpendicular to the central axis.

2. The pipe connection system of claim 1, wherein a last thread portion of the plurality of pin threads has a load flank angle that is between about +1.0 degree and about +1.1 degrees.

3. The pipe connection system of claim 2, wherein the load flank angle is about +1.0 degree.

4. The pipe connection system of claim 1, wherein a last thread portion of the plurality of pin threads is wider than remaining portions of the plurality of pin threads.

5. The pipe connection system of claim 1, wherein the last thread portion of the plurality of pin threads has an increased height relative to an adjacent thread portion of the plurality of pin threads.

6. The pipe connection system of claim 1, wherein each pin thread of the plurality of pin threads extends acutely with respect to a thread axis of the inner connector, and wherein the thread axis coincides with the central axis.

7. The pipe connection system of claim 1, wherein the plurality of pin threads comprises two helical pin threads.

8. The pipe connection system of claim 7, wherein the outer connector comprises two helical box threads.

9. The pipe connection system of claim 1, wherein one or more of the projections have a tapered profile.

10. The pipe connection system of claim 1, wherein the projections have rounded edges.

11. The pipe connection system of claim 1, wherein the plurality of pin threads further form recesses.

12. The pipe connection system of claim 11, wherein the recesses have a tapered profile.

13. The pipe connection system of claim 1, wherein the inner and outer connectors together form a metal-to-metal seal.

14. The pipe connection system of claim 1, wherein the double-thread construction comprises a first helical thread having a first pitch and a second helical thread having a second pitch that is different from the first pitch.

15. The pipe connection system of claim 14, wherein one of the first and second helical threads is positioned 180 degrees ahead of the other of the first and second helical threads.

16. A method comprising:
mating a first pipe section with a second pipe section at a pipe connection system, the pipe connection system comprising:
an inner connector of the first pipe section, the inner connector comprising a tapered wall and a plurality of pin threads arranged along the tapered wall, wherein a pitch between projections formed by the plurality of pin threads changes along an axial length of the inner connector, and wherein the pitch is most coarse at a tapered end of the inner connector;
a resilient seal that surrounds a terminal lip of the inner connector at the tapered end; and
an outer connector of the second pipe section, the outer connector formed complementary to the inner connector along at least a portion of the outer connector,
wherein the inner and outer connectors comprise a central axis and a double-thread construction that extends along the central axis,
wherein the terminal lip forms a reverse angle along which the terminal lip of the inner connector contacts a shoulder of the outer connector,
wherein the shoulder is formed complementarily to the terminal lip, and
wherein the reverse angle is an acute angle that is formed between an end surface of the terminal lip and a transverse axis oriented perpendicular to the central axis.

17. The pipe connection system of claim 1, wherein the terminal lip positively contacts the shoulder along an entire length of the end surface of the terminal lip.

18. The pipe connection system of claim 17, wherein the reverse angle is configured to promote a compression efficiency of the pipe connection system along an interface between the inner and outer connectors such that the reverse angle is about 15 degrees to about 15.5 degrees.

19. The pipe connection system of claim 18, wherein a contact between the terminal lip of the inner connector and the complementary shoulder of the outer connector forms a metal-to-metal seal.

20. The method of claim 16, wherein the plurality of pin threads comprises two helical pin threads, and the outer connector comprises two helical box threads.

* * * * *